United States Patent
Nguyen et al.

(10) Patent No.: US 10,387,218 B2
(45) Date of Patent: Aug. 20, 2019

(54) LOCK PROFILING TOOL TO IDENTIFY CODE BOTTLENECKS IN A STORAGE CONTROLLER

(71) Applicant: INTERNATIONAL BUSINESS MACHINES CORPORATION, Armonk, NY (US)

(72) Inventors: Trung N. Nguyen, Tucson, AZ (US); Louis A. Rasor, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 234 days.

(21) Appl. No.: 15/351,160

(22) Filed: Nov. 14, 2016

(65) Prior Publication Data
US 2018/0136986 A1    May 17, 2018

(51) Int. Cl.
G06F 9/52 (2006.01)
G06F 3/06 (2006.01)

(52) U.S. Cl.
CPC .............. *G06F 9/524* (2013.01); *G06F 3/061* (2013.01); *G06F 3/067* (2013.01); *G06F 3/0653* (2013.01); *G06F 3/0658* (2013.01)

(58) Field of Classification Search
CPC ........ G06F 3/061; G06F 3/0632; G06F 3/067; G06F 9/524
See application file for complete search history.

(56) References Cited

U.S. PATENT DOCUMENTS

| | | | | |
|---|---|---|---|---|
| 7,047,521 | B2* | 5/2006 | Bunnell | G06F 11/3466 714/E11.2 |
| 9,454,385 | B2 | 9/2016 | Standley et al. | |
| 2005/0203904 | A1* | 9/2005 | Mehaffy | G06F 9/526 |
| 2010/0179851 | A1* | 7/2010 | Sitarski | G06Q 10/06 705/7.23 |
| 2011/0113406 | A1* | 5/2011 | Flemming | G06F 11/3404 717/128 |
| 2015/0286586 | A1* | 10/2015 | Yadav | G06F 9/528 711/152 |
| 2016/0253370 | A1* | 9/2016 | Song | G06F 16/1774 707/704 |

OTHER PUBLICATIONS

Joao et al. "Bottleneck identification and scheduling in multithreaded applications." ACM SIGPLAN Notices 47.4 (2012): pp. 223-234. (Year: 2012).*

* cited by examiner

*Primary Examiner* — James J Lee
*Assistant Examiner* — Willy W Huaracha
(74) *Attorney, Agent, or Firm* — Janaki K. Davda; Konrad Raynes Davda & Victor LLP

(57) ABSTRACT

Provided are techniques for lock profiling tool to identify code bottlenecks. A lock spin duration for a lock is determined. It is determined that the lock spin duration is greater than a lock trace threshold. The lock spin duration is classified into a time duration bucket. It is determining whether the lock is found in a list of locks for the time duration bucket. In response to determining that the lock is found in the list of locks, a lock count for the lock is incremented by one. In response to determining that the lock is not found in the list of locks, an entry for the lock is added in the list of locks for the time duration bucket and the lock count for the lock is initialized to one. A total spin duration time for the lock is updated by the lock spin duration.

20 Claims, 10 Drawing Sheets

LOCK PROFILING TOOL TO IDENTIFY CODE BOTTLENECKS IN A STORAGE CONTROLLER

FIELD

Embodiments of the invention relate to efficient lock profiling tool to identify code bottlenecks in a storage controller.

BACKGROUND

A storage controller manages physical disk drives and presents them to the computer as logical units. Application code running on a storage controller may access many data structures that are protected by locks to synchronize access and update to the structures. Some of these locks may become a bottleneck for certain workloads, leading to a limit in performance or degradation in performance when host computers access the storage controller.

Some existing lock profiling tools include a lock trace tool in an operating system These tools provide very detailed information on lock usage by tracing each time a lock is attempted to be acquired, taken, and released. With the increase in Central Processing Units (CPUs) in a CPU complex, this approach consumes a very large amount of memory and disk space for the lock traces. Due to this, the tracing run-time window has to be extremely small (i.e., <1 sec), and the processing of the trace file may take hours before results are available. The tracing may also slow down execution of the code, potentially causing different behavior when lock tracing is on versus off.

SUMMARY

Provided is a computer program product for a lock profiling tool to identify code bottlenecks in a storage controller. The computer program product comprises a computer readable storage medium having program code embodied therewith, the program code executable by at least one processor to perform: determining, with a processor of a computer, a lock spin duration for a lock by subtracting a lock_miss_end_time from a lock_miss_start_time; determining that the lock spin duration is greater than a lock trace threshold; classifying the lock spin duration into a time duration bucket of a plurality of time duration buckets; determining whether the lock is found in a list of locks for the time duration bucket; in response to determining that the lock is found in the list of locks for the time duration bucket, incrementing a lock count for the lock by one; in response to determining that the lock is not found in the list of locks for the time duration bucket, adding an entry for the lock in the list of locks for the time duration bucket and initializing the lock count for the lock to one; and updating a total spin duration time for the lock by the lock spin duration.

Provided is a computer system for a lock profiling tool to identify code bottlenecks in a storage controller. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: determining, with a processor of a computer, a lock spin duration for a lock by subtracting a lock_miss_end_time from a lock_miss_start_time; determining that the lock spin duration is greater than a lock trace threshold; classifying the lock spin duration into a time duration bucket of a plurality of time duration buckets; determining whether the lock is found in a list of locks for the time duration bucket; in response to determining that the lock is found in the list of locks for the time duration bucket, incrementing a lock count for the lock by one; in response to determining that the lock is not found in the list of locks for the time duration bucket, adding an entry for the lock in the list of locks for the time duration bucket and initializing the lock count for the lock to one; and updating a total spin duration time for the lock by the lock spin duration.

Provided is a method for a lock profiling tool to identify code bottlenecks in a storage controller. The method comprises: determining, with a processor of a computer, a lock spin duration for a lock by subtracting a lock_miss_end_time from a lock_miss_start_time; determining that the lock spin duration is greater than a lock trace threshold; classifying the lock spin duration into a time duration bucket of a plurality of time duration buckets; determining whether the lock is found in a list of locks for the time duration bucket; in response to determining that the lock is found in the list of locks for the time duration bucket, incrementing a lock count for the lock by one; in response to determining that the lock is not found in the list of locks for the time duration bucket, adding an entry for the lock in the list of locks for the time duration bucket and initializing the lock count for the lock to one; and updating a total spin duration time for the lock by the lock spin duration.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments identify potential problematic locks, which is helpful in finding and fixing the bottlenecks to increase performance, especially as the number of processors (e.g., Central Processing Units (CPUs) in a CPU complex) greatly increase.

Figure 1:
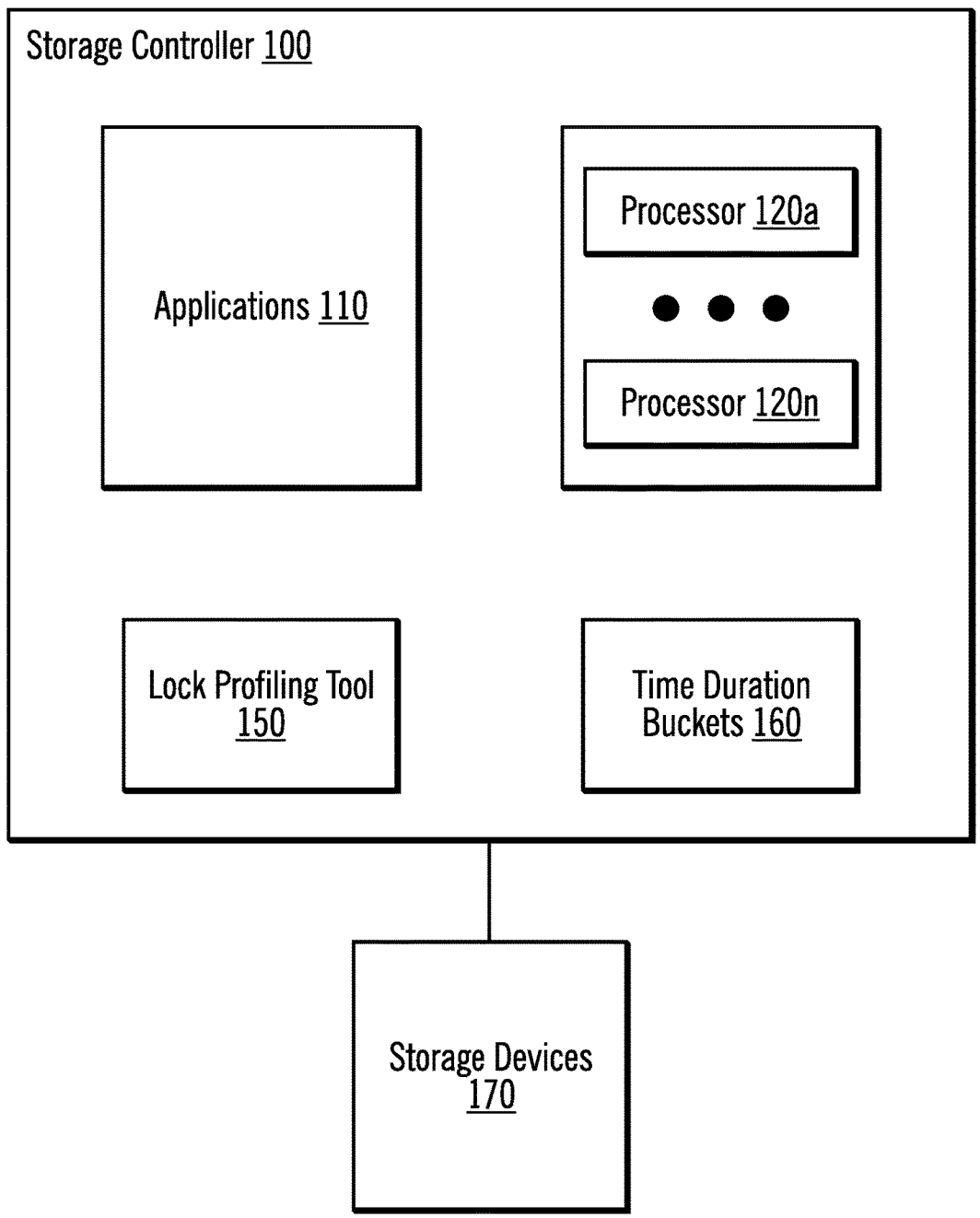
FIG. 1 illustrates, in a block diagram, a computing environment in accordance with certain embodiments.

FIG. 1 illustrates, in a block diagram, a computing environment in accordance with certain embodiments. In FIG. 1, a storage controller 100 is coupled to storage devices 170. The storage devices 170 may be Direct Access Storage Devices (DASDs). DASDs may be described as storage devices in which each physical record has a discrete location and a unique address. DASDs include, for example, disk drives, magnetic drums, data cells, and optical disc drives.

The storage controller 100 includes applications 110, multiple processors represented as processor 120a . . . 120n, a lock profiling tool 150, and time duration buckets 160. In certain embodiments, each of the time duration buckets is associated with a different amount of time. The ellipses (" . . . ") between processor 120a and processor 120n indicate that there may be any number of processors.

The lock profiling tool 150 uses a histogram (bucket) approach to focus only on finding the potential problematic locks, rather than profiling all locks. Hence, the lock profiling tool 150 is efficient and requires very little memory. The lock profiling tool 150 covers a very large window of run-time and the results of profiling may be obtained immediately after the measured run-time window is complete.

With embodiments, hooks are added in the lock spin code of the applications 110 (when the lock is missed) to keep track of locks that have long spin duration. Hooks may be described as additional code or statements that augment the lock spin code to gather profiling data. The memory requirement to store the data may be minimal as the number of locks that have high spin duration for a given workload are typically few. Also, as the lock spin code for the hooks is simple and in the spin portion, the lock spin code is not likely to affect the behavior of the original code when profiling is enabled.

Figure 2:
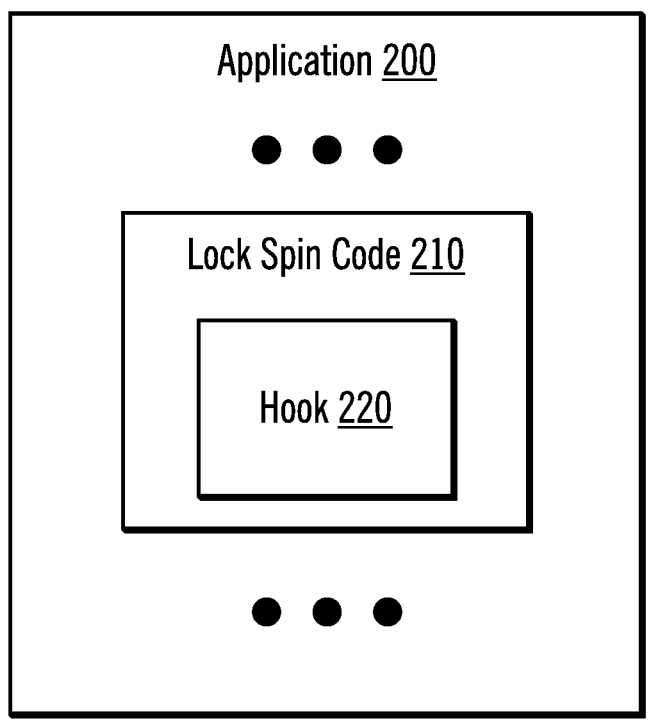
FIG. 2 illustrates, in a block diagram, a hook in accordance with certain embodiments.

FIG. 2 illustrates, in a block diagram, a hook 220 in accordance with certain embodiments. In FIG. 2, an application 200 includes code (represented by the ellipses (" . . . ")), and the code includes the lock spin code 210. The hook 220 is added to the lock spin code 210.

Figure 3:
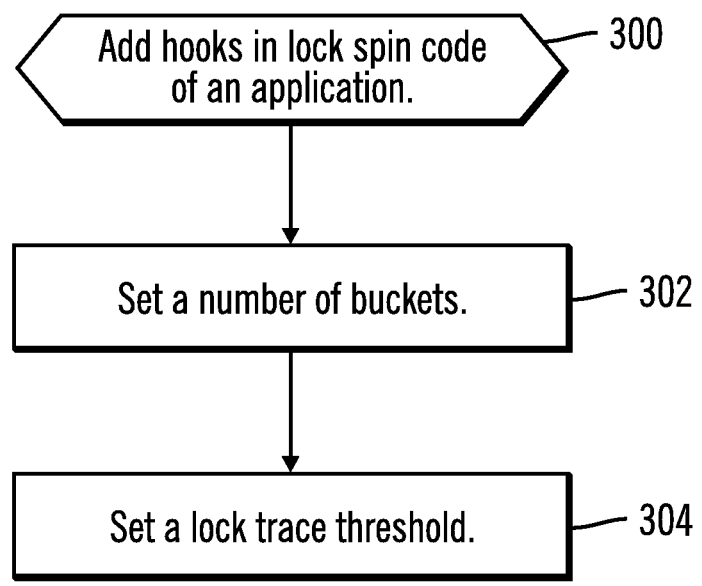
FIG. 3 illustrates, in a flow chart, operations for configuration in accordance with certain embodiments.

FIG. 3 illustrates, in a flow chart, operations for configuration in accordance with certain embodiments. In block 300, a system administrator sets hooks in the lock spin code of an application. In block 302, the system administrator sets a number of buckets. In block 304, the system administrator sets a lock trace threshold.

With embodiments, the lock spin threshold may be set automatically by the lock profiling tool 150. For example, the lock trace threshold may be automatically determined based on the CPU (or processor) type and speed. For example, if the system has CPUs running at 4 Ghz (gigahertz), the lock profiling tool 150 may set the lock trace threshold to 32 microseconds. As another example, if the CPUs are running at 3 Ghz, the lock profiling tool 150 may set the lock trace threshold to 4/3*32 microseconds or 42.5 microseconds.

With embodiments, there may be a fixed number of buckets, but the buckets may have different ranges. For example, with the CPUs running at 4 Ghz, the lock profiling tool 150 may have buckets at <64 microseconds, <128 microseconds, <256 microseconds, <512 microseconds, >=1 millisecond intervals, whereas with the CPUs running at 3 Ghz, the lock profiling tool 150 may have buckets at <85 microseconds, <170 microseconds, <340 microseconds, <680 microseconds, >=1.36 milliseconds.

Thus, with embodiments, the lock trace threshold is set based on a processor type and speed, and wherein a number of buckets is set using ranges of time In certain embodiments, the system administrator adds the hooks 1) where a lock attempt is done and the code must spin for the lock (i.e., lock miss) and 2) where the lock spin is complete (i.e., the lock is obtained). The lock spin may be described as the application waiting for the lock.

Figure 4A:
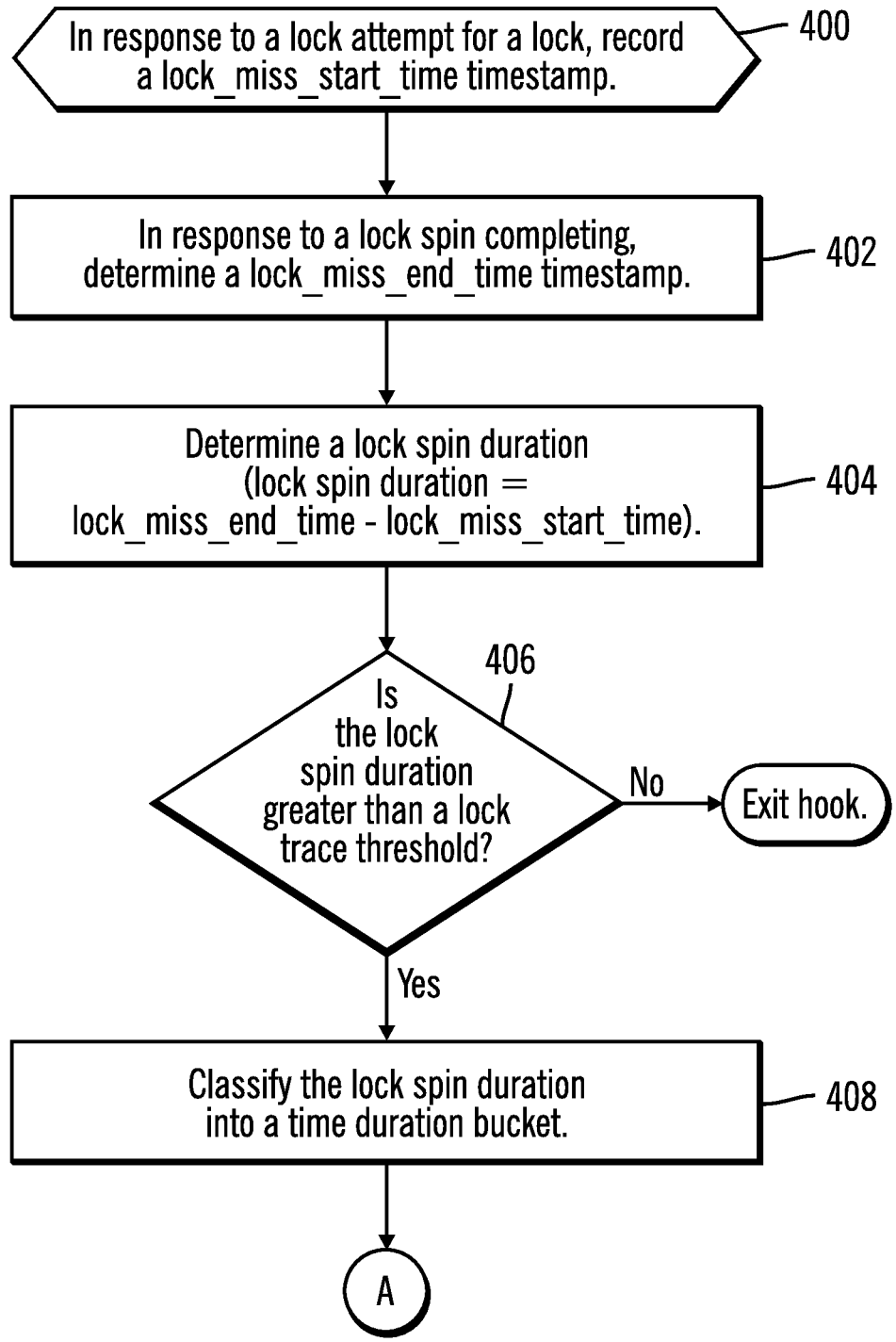
FIGS. 4A and 4B illustrate, in a flow chart, operations for a lock trace in accordance with certain embodiments.
Figure 4B:
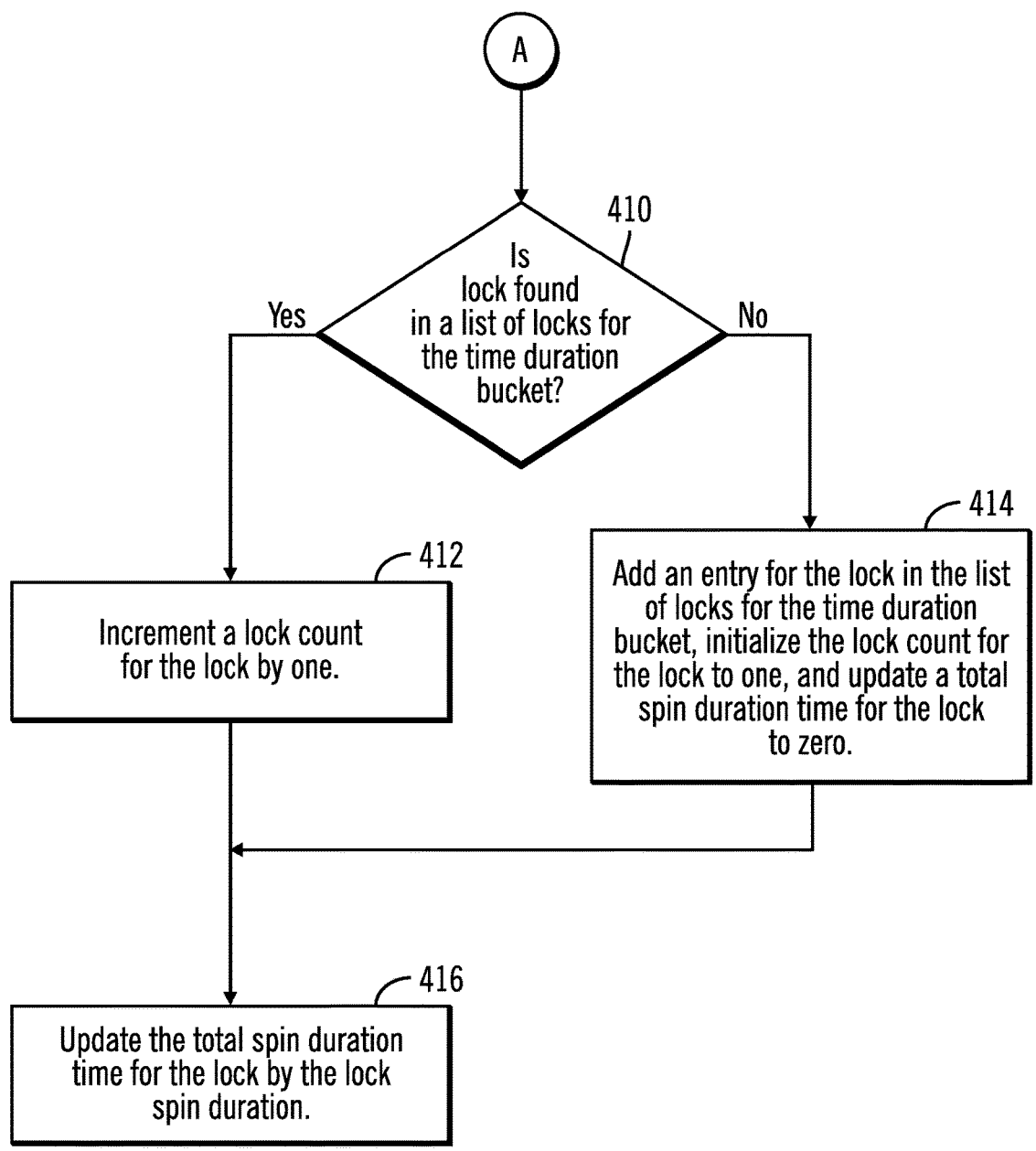

FIGS. 4A and 4B illustrate, in a flow chart, operations for a lock trace in accordance with certain embodiments. The processing of FIGS. 4A and 4B begins after the trace enabled flag is set to indicate that tracing is to occur when the application with the lock spin code having hooks is run (executed). Control begins at block 400 with the hook, in response to a lock attempt for a lock, recording a lock_miss_start_time timestamp. In block 402, the hook, in response to a lock spin completing (i.e., when the lock spin is complete so that the lock is obtained), determines a lock_miss_end_time timestamp. In block 404, the hook determines a lock spin duration using the following formula:

$$\text{lock spin duration} = \text{lock\_miss\_end\_time} - \text{lock\_miss\_start\_time}$$

In block 406, the hook determines whether the lock spin duration is greater than a lock trace threshold. If so, processing continues to block 408, otherwise, the hook is exited. That is, embodiments exit out of the hook and the normal lock spin code resumes. In block 408, the hook classifies the lock spin duration into a time duration bucket. For example, if the lock trace threshold is 32 microseconds, there may be six buckets as follows: <64 microseconds, <128 microseconds, <256 microseconds, <512 microseconds, <1 milliseconds, and >=1 milliseconds.

From block 408 (FIG. 4A), processing continues to block 410 (FIG. 4B). In block 410, the hook determines whether the lock is found in a list of locks for the time duration bucket. This may be done based on the address of the lock being in the list of locks. If so, processing continues to block 412, otherwise, processing continues to block 414.

In block 412, the hook increments a lock count for the lock by one.

In block 414, the hook adds an entry for the lock in the list of locks for the time duration bucket, initializes the lock count for the lock to one, and updates a total spin duration time for the lock to zero. With embodiments, the entry for the lock includes the following information:

a) lock address
 b) lock count (how many times the lock was missed and require spinning; when a lock is first added, the lock count=1)
 c) total spin duration time, which equals the lock spin duration (total time spinning for the lock)
 d) debug information for the lock (e.g., code module and line number where the lock is taken)

From both blocks 412 and 414, processing continues to block 416. In block 416, the hook updates the total spin duration time for the lock by the lock spin duration (i.e., total spin duration time+=lock spin duration).

Figure 5:
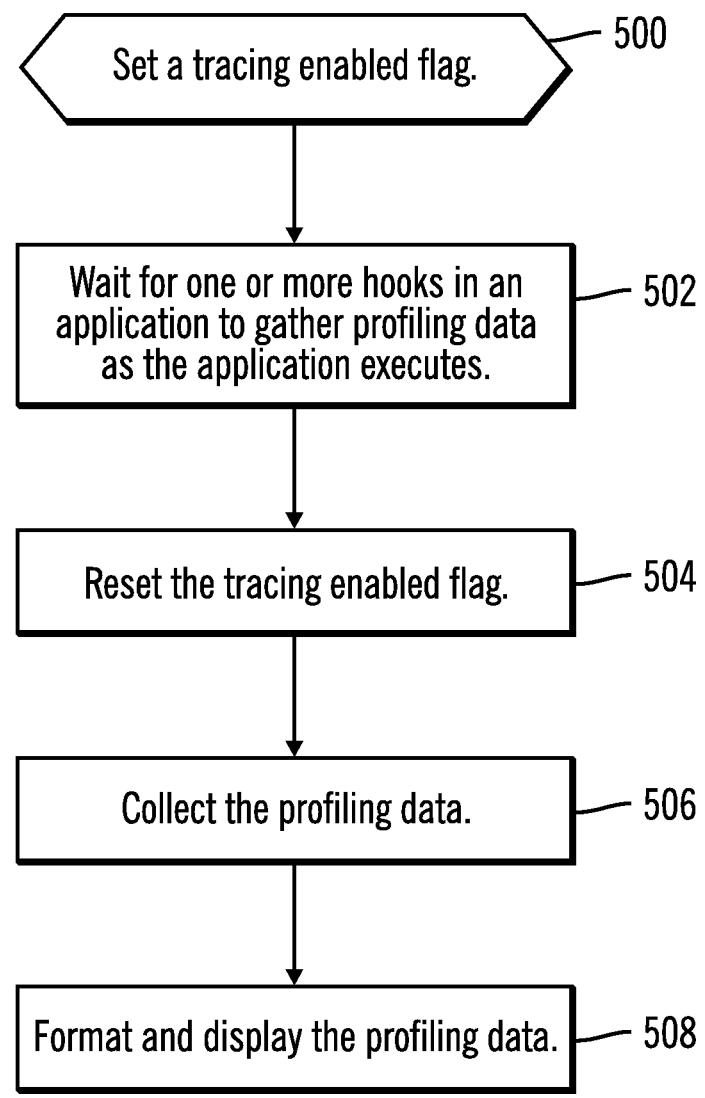
FIG. 5 illustrates, in a flow chart, operations by a lock profiling tool in accordance with certain embodiments.

FIG. 5 illustrates, in a flow chart, operations by a lock profiling tool in accordance with certain embodiments. Control begins at block 500 with the lock profiling tool 150 setting a tracing enabled flag to indicate that tracing is to occur. In certain embodiments, the tracing enabled flag has a first value (e.g., 1) to indicate that tracing is enabled and has a second value (e.g., 0) to indicate that tracing is not enabled. In block 502, the lock profiling tool 150 waits for one or more hooks in an application to gather profiling data while the application is executing. The profiling data includes the lock addresses in the lock buckets. In block 504, the lock profiling tool 150 resets (clears) the tracing enabled flag to indicate that tracing is completed at this time.

In block 506, the lock profiling tool 150 collects the profiling data. In block 508, the lock profiling tool 150 formats and displays (e.g., on a computer screen or in a printed report) the profiling data.

In certain embodiments, the hooks are considered part of the lock profiling tool 150. The lock profiling tool 150 may include: a script that turns on (sets) the tracing enabled flag, waits for some duration, and turns off (resets) the tracing enabled flag. The hooks gather the profiling data. Then, another script collects that profiling data, formats the profiling data, and displays the profiling data.

Thus, in certain embodiments, the system administrator provides a set of input parameters to the application to be profiled and starts the application. Then, a lock trace threshold is set to a desired target value (for example, 32 microseconds), and the tracing enabled flag is turned on (e.g., by the lock profiling tool 150 or by the system administrator) to perform lock profiling. After a desired duration, such as 60 seconds, or after the application completes, the tracing enabled flag is turned off (e.g., by the lock profiling tool 150 or by the system administrator). After that, embodiments collect the list of locks in the time duration buckets that had spin time greater than the trace threshold.

Figure 6:
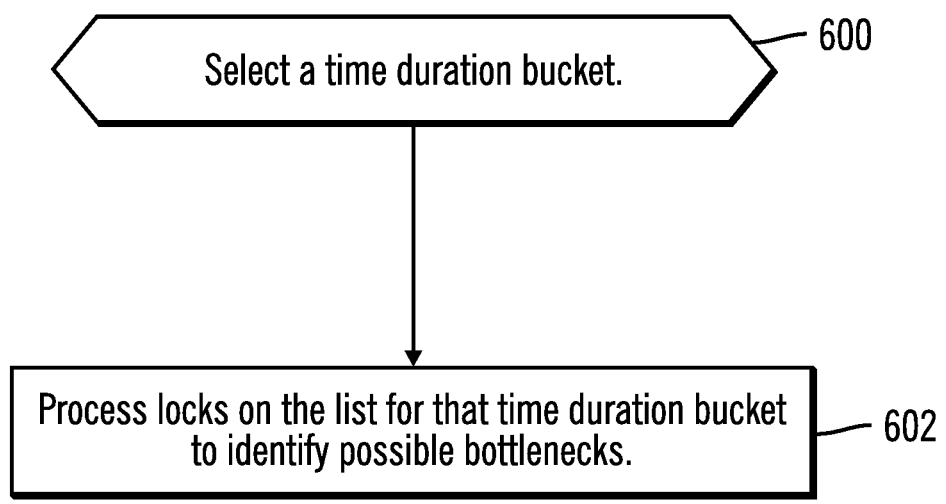
FIG. 6 illustrates, in a flow chart, operations for processing a time duration bucket.

FIG. 6 illustrates, in a flow chart, operations for processing a time duration bucket. Control begins at block 600 with a system administrator selecting a time duration bucket. In block 602, the system administrator processes the locks on the list for the time duration bucket to identify possible bottlenecks. With embodiments, the system administrator may examine the lock spin code that uses the locks identified and then possibly change the application so that those locks are not limiting the performance of the application.

With embodiments, the processing of FIG. 6 is done for each of the time duration buckets.

With embodiments, in a multi-core/multiprocessing environment where there is lock contention, using a histogram approach, only the list of locks within a certain time duration that had a spin time greater than the trace threshold are collected.

Embodiments find problematic locks by collecting only the list of locks within certain time durations that have a spin time greater than a lock trace threshold using a histogram (bucket) approach.

Figure 7:
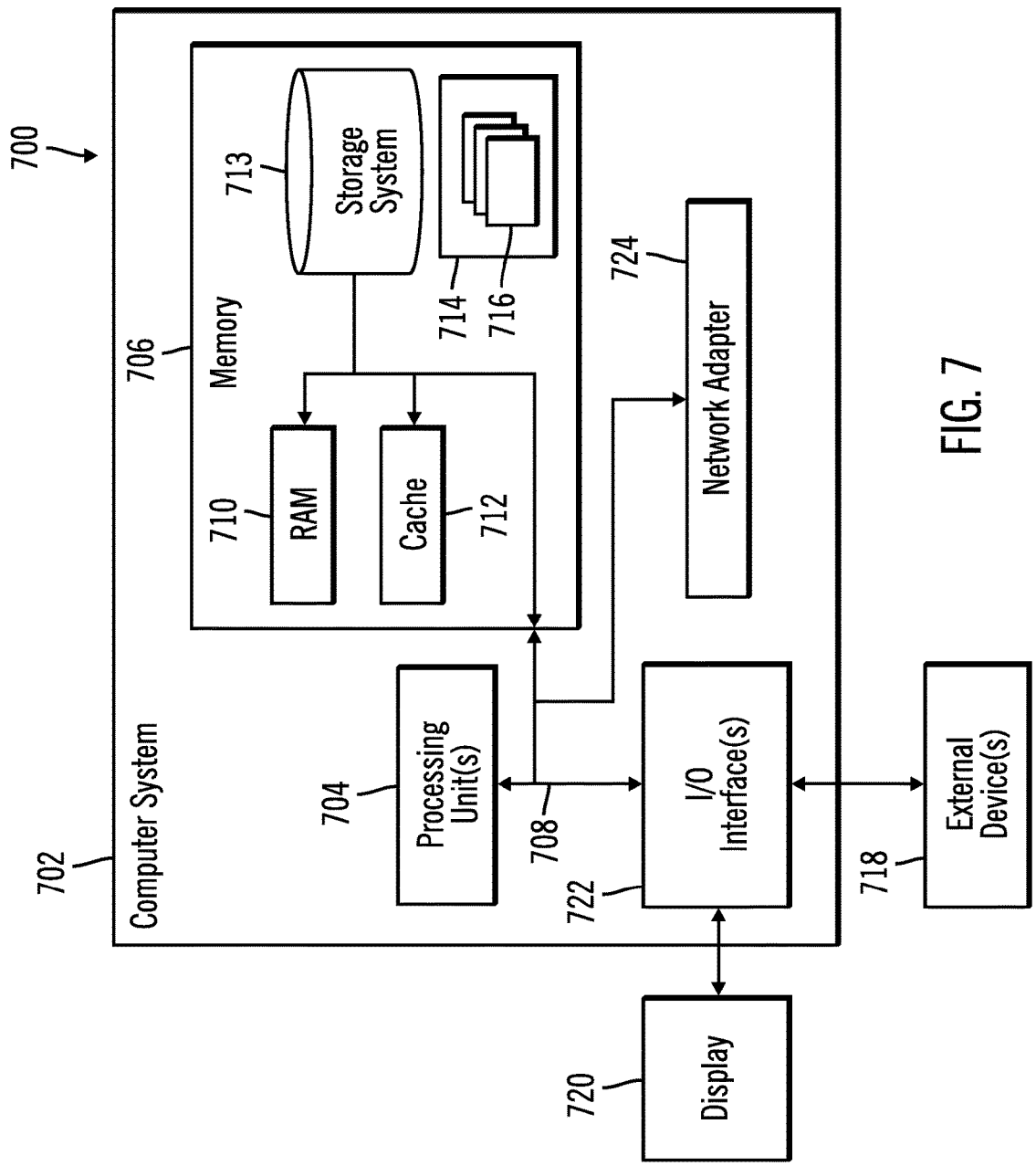
FIG. 7 illustrates a computing architecture in which the components of FIG. 1 may be implemented.

FIG. 7 illustrates a computing architecture in which the components of FIG. 1 may be implemented. In certain embodiments, computing device 100 may implement computer architecture 700.

Computer system/server 702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

Certain embodiments are directed to dynamically changing the size/allocation of data segments of a shared main buffer allocated to multiple threads/processes based on the utilization rate of the data segments by utilizing a management thread.

With embodiments, the management thread is able to assign random data segments from the shared main buffer to the sub-buffers. With that infrastructure in place, data segments may be taken from any underutilized sub-buffer to complement a heavily utilized sub-buffer. With embodiments, data segments may be transferred between the sub-buffers.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The systems of FIG. 1 may be implemented in one or more computer systems 702, where if they are implemented in multiple computer systems 702, then the computer systems may communicate over a network.

Computer system/server 702 may also communicate with one or more external devices 718 such as a keyboard, a pointing device, a display 720, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
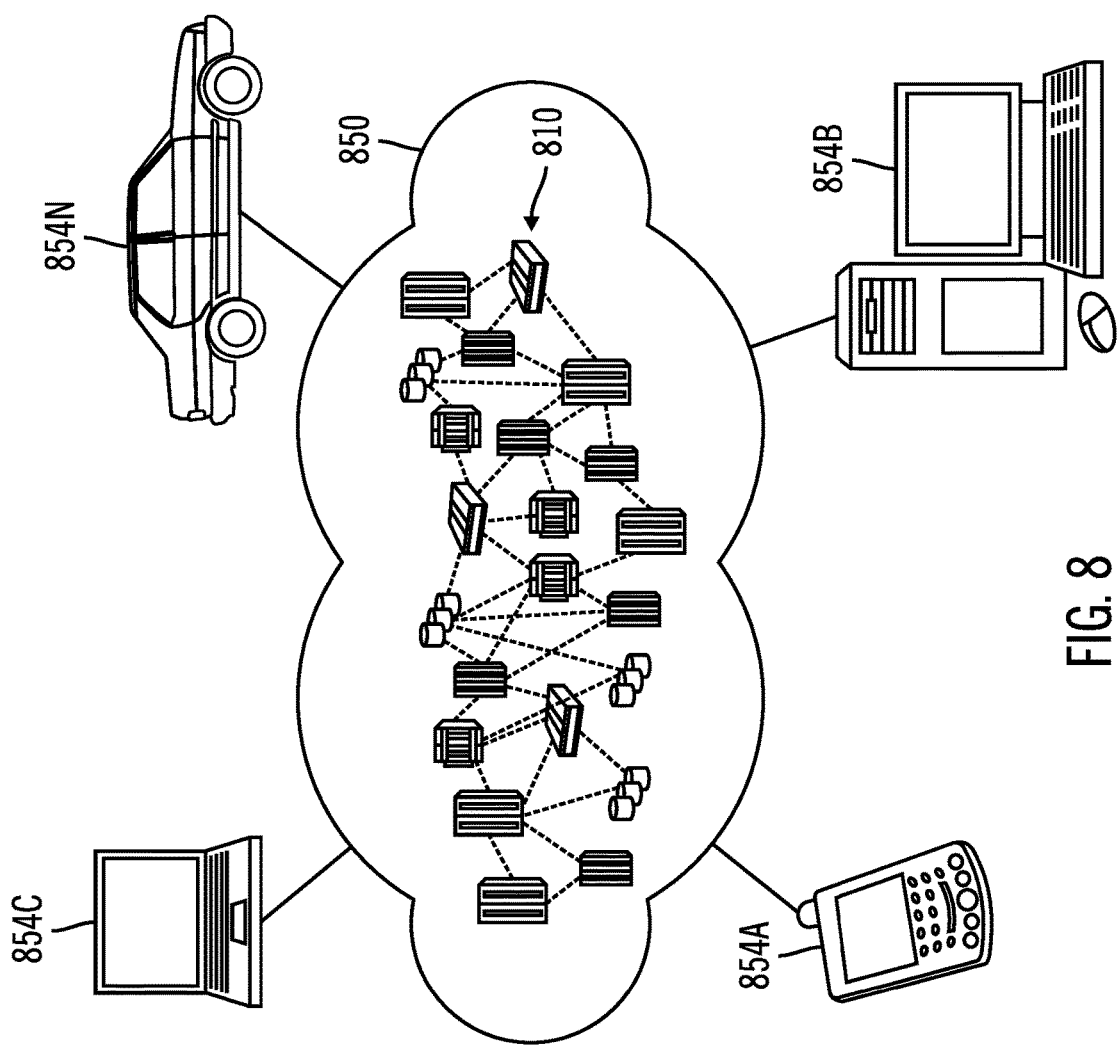
FIG. 8 illustrates a cloud computing environment according to an embodiment of the present invention.

Referring now to FIG. 8, illustrative cloud computing environment 850 is depicted. As shown, cloud computing environment 850 includes one or more cloud computing nodes 10 with which local computing devices used by cloud consumers, such as, for example, personal digital assistant (PDA) or cellular telephone 854A, desktop computer 854B, laptop computer 854C, and/or automobile computer system 854N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 10 and cloud computing environment 850 can communicate with any type of computerized device over any type of network and/or network addressable connection (e.g., using a web browser).

Figure 9:
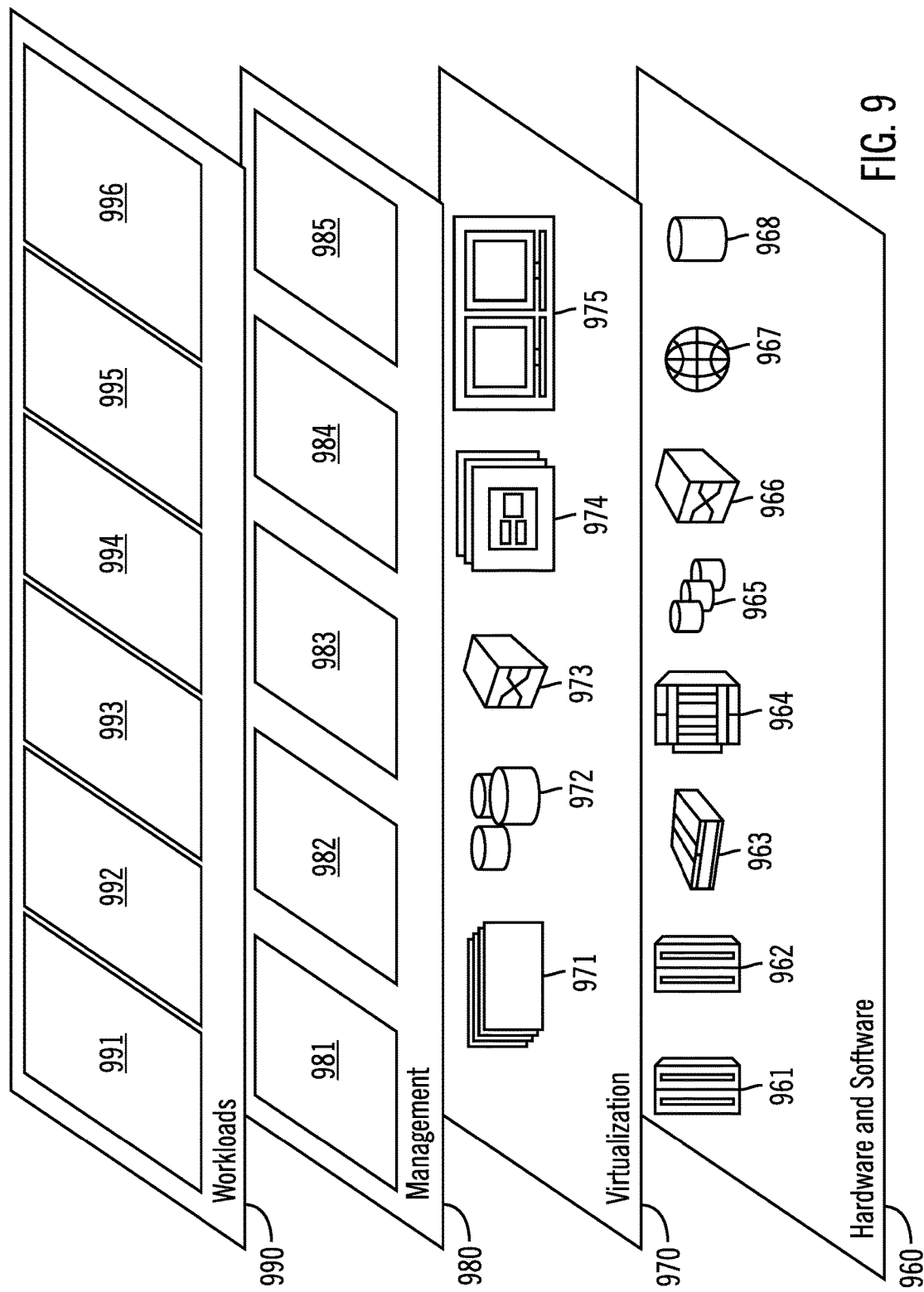
FIG. 9 illustrates abstraction model layers according to an embodiment of the present invention.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and efficient lock profiling tool to identify code bottlenecks in a storage controller 996.

Thus, in certain embodiments, software or a program, implementing efficient lock profiling tool to identify code bottlenecks in a storage controller in accordance with embodiments described herein, is provided as a service in a cloud infrastructure.

In certain embodiments, the storage controller 100 is part of a cloud infrastructure. In other embodiments, the storage controller 100 is not part of a cloud infrastructure.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for identifying locks that cause bottlenecks, the computer program product comprising a computer readable storage medium having program code embodied therewith, the program code executable by at least one processor to perform:

creating a plurality of time duration buckets, wherein each of the time duration buckets is associated with a different range of time, wherein each of the time duration buckets is created to store locks that have a corresponding lock spin duration in a range of time of that time duration bucket and wherein the corresponding lock spin duration represents a first amount of time during which an application is waiting for a corresponding lock;

determining a lock spin duration for a lock by subtracting a lock_miss_end_time from a lock_miss_start_time;

determining that the lock spin duration is greater than a lock trace threshold, wherein the lock trace threshold is a second amount of time, and wherein locks having corresponding lock spin durations greater than the lock trace threshold are added to the time duration buckets;

identifying a time duration bucket of the plurality of time duration buckets based on the lock spin duration falling into the different range of time of the time duration bucket;

determining whether the lock is found in a list of locks for the time duration bucket based on a lock address of the lock being in the list of locks;

in response to determining that the lock is found in the list of locks for the time duration bucket, incrementing a lock count for the lock by one, wherein the lock count indicates how many times the lock had lock spin durations greater than the lock trace threshold;

in response to determining that the lock is not found in the list of locks for the time duration bucket,
    adding an entry for the lock in the list of locks for the time duration bucket; and
    initializing the lock count for the lock to one; and updating a total spin duration time for the lock by the lock spin duration.

2. The computer program product of claim 1, wherein the program code is executable by at least one processor to perform:
    in response to a lock attempt for a lock, recording a lock_miss_start_time timestamp; and
    in response to a lock spin completing, determining a lock_miss_end_time timestamp.

3. The computer program product of claim 1, wherein the entry comprises the lock address of the lock, the lock count, the total spin duration time, and debug information for the lock.

4. The computer program product of claim 1, wherein hooks are added to lock spin code of an application 1) where a lock attempt is done and 2) where a lock spin is complete.

5. The computer program product of claim 4, wherein a trace enabled flag is set to indicate that tracing is to occur when the application is executed.

6. The computer program product of claim 4, wherein the application is executed on a node in a cloud infrastructure.

7. The computer program product of claim 1, wherein the lock trace threshold is set based on a processor type and speed.

8. A computer system for identifying locks that cause bottlenecks, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more memories, to perform operations comprising:
creating a plurality of time duration buckets, wherein each of the time duration buckets is associated with a different range of time, wherein each of the time duration buckets is created to store locks that have a corresponding lock spin duration in a range of time of that time duration bucket and wherein the corresponding lock spin duration represents a first amount of time during which an application is waiting for a corresponding lock;
determining a lock spin duration for a lock by subtracting a lock_miss_end_time from a lock_miss_start_time;

determining that the lock spin duration is greater than a lock trace threshold, wherein the lock trace threshold is a second amount of time, and wherein locks having corresponding lock spin durations greater than the lock trace threshold are added to the time duration buckets;

identifying a time duration bucket of the plurality of time duration buckets based on the lock spin duration falling into the different range of time of the time duration bucket;

determining whether the lock is found in a list of locks for the time duration bucket based on a lock address of the lock being in the list of locks:

in response to determining that the lock is found in the list of locks for the time duration bucket, incrementing a lock count for the lock by one, wherein the lock count indicates how many times the lock had lock spin durations greater than the lock trace threshold;

in response to determining that the lock is not found in the list of locks for the time duration bucket,
    adding an entry for the lock in the list of locks for the time duration bucket; and
    initializing the lock count for the lock to one; and updating a total spin duration time for the lock by the lock spin duration.

9. The computer system of claim 8, wherein the operations further comprise:
    in response to a lock attempt for a lock, recording a lock_miss_start_time timestamp; and
    in response to a lock spin completing, determining a lock_miss_end_time timestamp.

10. The computer system of claim 8, wherein the entry comprises the lock address of the lock, the lock count, the total spin duration time, and debug information for the lock.

11. The computer system of claim 8, wherein hooks are added to lock spin code of an application 1) where a lock attempt is done and 2) where a lock spin is complete.

12. The computer system of claim 11, wherein a trace enabled flag is set to indicate that tracing is to occur when the application is executed.

13. The computer system of claim 11, wherein the application is executed on a node in a cloud infrastructure.

14. The computer system of claim 8, wherein the lock trace threshold is set based on a processor type and speed.

15. A computer-implemented method for identifying locks that cause bottlenecks, comprising:
creating a plurality of time duration buckets, wherein each of the time duration buckets is associated with a different range of time, wherein each of the time duration buckets is created to store locks that have a corresponding lock spin duration in a range of time of that time duration bucket and wherein the corresponding lock spin duration represents a first amount of time during which an application is waiting for a corresponding lock;
determining, with a processor of a computer, a lock spin duration for a lock by subtracting a lock_miss_end_time from a lock_miss_start_time;
determining that the lock spin duration is greater than a lock trace threshold, wherein the lock trace threshold is a second amount of time, and wherein locks having corresponding lock spin durations greater than the lock trace threshold are added to the time duration buckets;
identifying a time duration bucket of the plurality of time duration buckets based on the lock spin duration falling into the different range of time of the time duration bucket;

determining whether the lock is found in a list of locks for the time duration bucket based on a lock address of the lock being in the list of locks;

in response to determining that the lock is found in the list of locks for the time duration bucket, incrementing a lock count for the lock by one, wherein the lock count indicates how many times the lock had lock spin durations greater than the lock trace threshold;

in response to determining that the lock is not found in the list of locks for the time duration bucket,
   adding an entry for the lock in the list of locks for the time duration bucket; and
   initializing the lock count for the lock to one; and updating a total spin duration time for the lock by the lock spin duration.

16. The computer-implemented method of claim 15, further comprising:
   in response to a lock attempt for a lock, recording a lock miss start time timestamp; and
   in response to a lock spin completing, determining a lock miss end time timestamp.

17. The computer-implemented method of claim 15, wherein the entry comprises the lock address of the lock, the lock count, the total spin duration time, and debug information for the lock.

18. The computer-implemented method of claim 15, wherein hooks are added to lock spin code of an application 1) where a lock attempt is done and 2) where a lock spin is complete.

19. The computer-implemented method of claim 18, wherein a trace enabled flag is set to indicate that tracing is to occur when the application is executed.

20. The computer-implemented method of claim 18, wherein the application is executed on a node in a cloud infrastructure.

* * * * *